Figure 1:
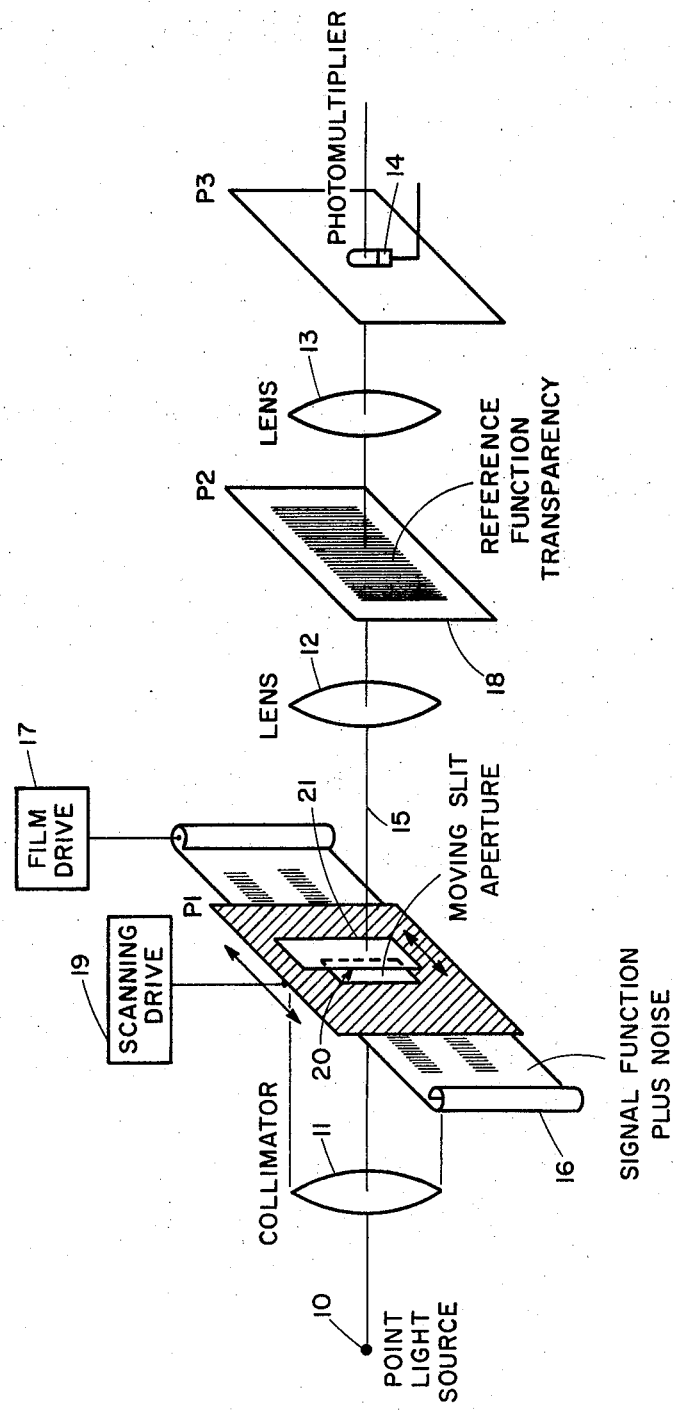

United States Patent [19]
Williams

[11] 3,768,907
[45] Oct. 30, 1973

[54] SCANNING APERTURE PARTIALLY COHERENT OPTICAL CORRELATOR
[75] Inventor: Ross E. Williams, Yonkers, N.Y.
[73] Assignee: The United States of America as represented by the Secretary of the Navy, Washington, D.C.
[22] Filed: July 17, 1972
[21] Appl. No.: 272,537

[52] U.S. Cl. ............... 356/71, 350/162 SF, 356/167
[51] Int. Cl. ........................... G06k 9/08, G02b 5/18
[58] Field of Search ...................... 356/71, 165, 166, 356/167, 168; 350/162 SF

[56] References Cited
UNITED STATES PATENTS
2,787,188   4/1957   Berger ............................... 356/167

Primary Examiner—David Schonberg
Assistant Examiner—V. P. McGraw
Attorney—R. S. Sciascia et al.

[57] ABSTRACT

A partially coherent optical correlator of, for example, the frequency plane type, has a slit of adjustable width that moves rapidly in the spatial domain $P_1$ to scan a portion of the input signal recorded on a film strip which is moving relatively slowly in this same domain. The slit produces a plurality of correlation samples that are added incoherently in an energy detector located in the output plane $P_3$ to give one sample of the partially coherent correlation function for each scanning cycle. Repeated scanning cycles develop the full, partially coherent, correlation function.

4 Claims, 2 Drawing Figures

SCANNING APERTURE PARTIALLY COHERENT OPTICAL CORRELATOR

The present invention relates generally to optical data processing and filtering systems and, more particularly, to a partially coherent optical correlator for processing distorted signals.

In the conventional optical correlator, the signal function which is to be correlated is recorded as a density variation on a photographic film strip, and this strip, illuminated normally by monochromatic, coherent, collimated light, is advanced in the object plane $P_1$ of a simple spherical lens. As is well known, a Fourier transform relation exists between the light amplitude distributions at the front and back focal planes of such a lens. Consequently, a reference transparency having the complex conjugate of the Fourier transform of the above signal function recorded thereon, is inserted in the back focal plane of the spherical lens. This plane $P_2$ is the first frequency plane of the correlator. A second spherical lens, which has the reference transparency in its front focal plane, performs an inverse Fourier transform, and a suitable energy detector is positioned in the back focal plane $P_3$ of this second lens.

The plane $P_1$, in which the signal function is introduced, is called the "spatial domain," while the plane $P_2$, in which the reference transparency is introduced, is called the "frequency domain." As an alternative to inserting the reference transparency in the frequency domain, a transparency with an appropriate transmittance characteristic may be utilized in a subsequent spatial domain of the correlator.

In the case where the signal that is being processed in the correlator is partially distorted along its time base so that it does not have a coherent relationship with the signal recorded, those separate portions of the correlation function which appear in the output plane $P_3$ will have dissimilar phase relationships. Hence, destructive interference occurs when their amplitudes are directly added by the photomultiplier tube, which is a typical energy detector commonly used in the correlator. This interference effect thus limits the usefulness of the standard correlator in processing slightly distorted or partially coherent signals, for with these signals there is no appreciable output signal from the correlator and, consequently, the correlator does not indicate the fact that there may be some degree of coherence between the input signal and the reference signal.

In underwater object detecting and locating systems and in geophysical exploration systems, the coherence of the received signal with respect to the radiated signal is limited by, for example, perturbations of the signal source and receiver motions, the movement of reflecting objects, and by unpredictable movements taking place within the water mass itself. All of these conditions, however, result in signal changes that are relatively slow compared to the signal duration. Thus, the received signal may be considered a partially coherent one.

According to the present invention, the film strip which carries the input signal is moved relatively slowly across the aperture of an optical correlator of the type generally described above. However, as this movement takes place, a slit, whose width may be adjusted, is moved rapidly in the spatial domain $P_1$ to scan a portion of the input signal track. This scanning can be back and forth or only in the direction of film travel. This movement of the slit produces a plurality of correlation samples that are added incoherently in the energy detector in the output plane $P_3$ to give one sample of the partially coherent correlation function for each scanning cycle. Repeated scanning cycles develop the full partially coherent correlation function as the signal film moves through plane $P_1$. By repeatedly scanning the relatively slow moving film strip at an appropriate speed, the slit, in effect, samples the correlation functions from individual segments of the signal, all for a given displacement of the signal relative to the reference function, and causes these correlation samples to appear in rapid sequence at the photomultiplier tube or energy detector where they are added incoherently. Because the slit examines only a relatively short segment of the input signal, and because the width of the correlation function is inversely proportional to the bandwidth of the signal being processed, the peaks of the individual correlation functions so produced are sufficiently broad, especially in the case of FM signals, to overlap. The photodetector thus can sum up these individual functions, and the resultant is a partially coherent correlation of the distorted input signal and the replica, for example, represented by the recorded information on the transparency in the frequency domain $P_2$.

It is accordingly a primary object of the present invention to provide an optical correlator which can be utilized with partially distorted signals.

Another object of the present invention is to provide a standard space or frequency plane optical correlator with a scanning aperture of adjustable width for processing signals which are partially coherent.

Another object of the present invention is to provide an optical correlator wherein selected segments of a distorted signal may be compared with the reference function.

Figure 2:
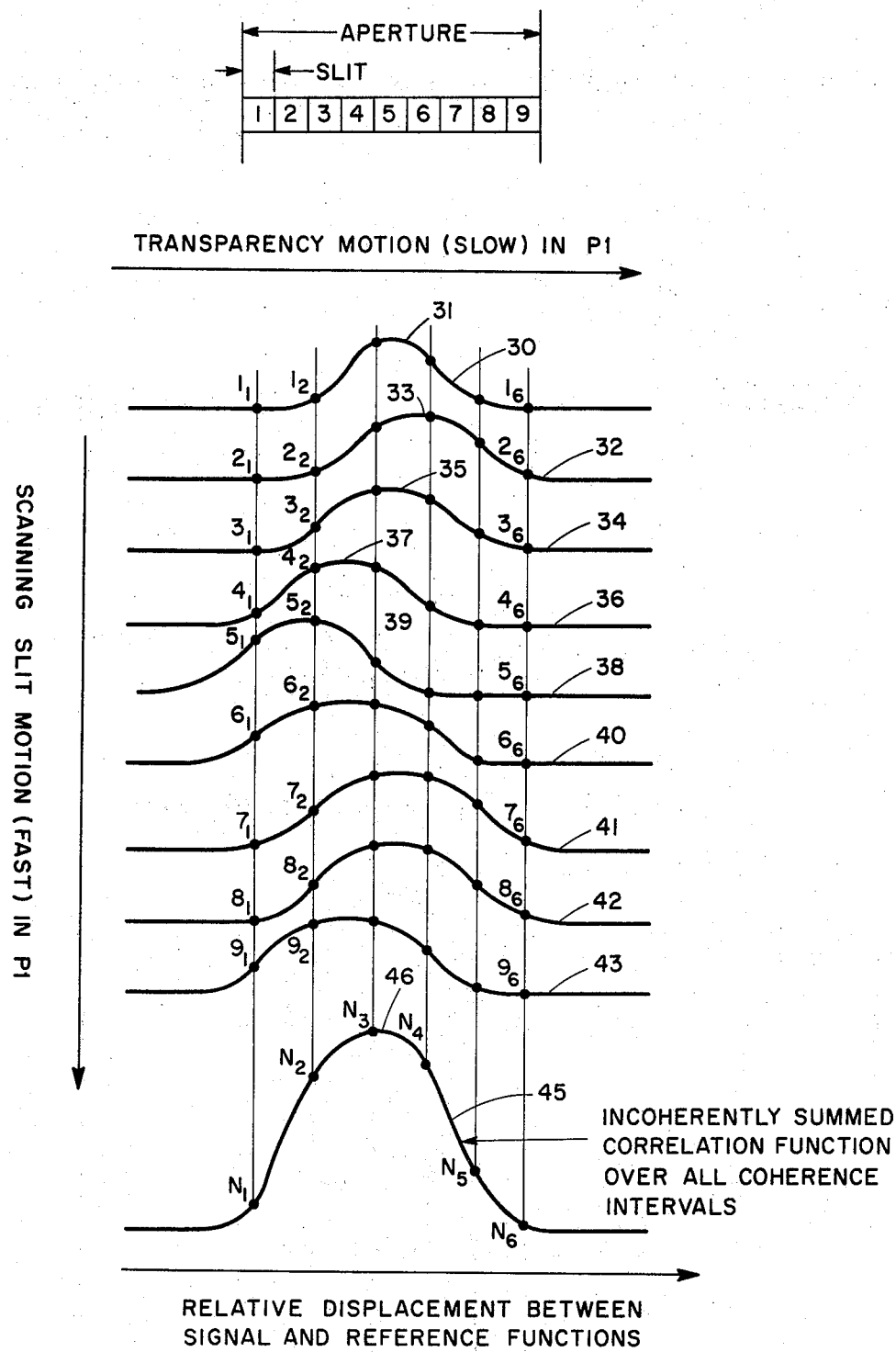

Other objects, advantages and novel features of the invention will become apparent from the following detailed description of the invention when considered in conjunction with the accompanying drawings wherein:

FIG. 1 schematically illustrates one simplified embodiment of the present invention; and FIG. 2 shows a plurality of the correlation function envelopes which occur at the output plane, together with the resultant obtained when these individual envelopes are added incoherently.

Referring now to FIG. 1 of the drawings, it will be seen that the partially coherent optical correlator of the present invention in its schematic form includes a point light source 10, a collimator 11, a pair of spaced spherical lenses 12 and 13, and an energy detector 14, all symmetrically disposed with respect to an optical axis 15. A signal which is to be correlated and which may, perhaps, be mixed with noise is recorded on a photographic film strip 16 which is arranged to be advanced in the front focal plane $P_1$ of lens 12 in a direction transverse to the above optical axis. Any suitable drive mechanism with an appropriate speed control feature, such as 17, may be used for this purpose.

The input signal, as noted hereinbefore, is recorded as a density variation on film strip 16 and, depending upon the particular data processing application involved, one or more signal tracks may exist across the width of the film strip.

Positioned in the back focal plane $P_2$ of lens 12, the transform plane, is the reference transparency 18. This transparency lies in a plane transverse to the optical axis of the system so as to be parallel to that portion of the film strip 16 which is being processed. Recorded on this transparency is the complex conjugate of the Fourier transform of the input signal. Thus, for example, if the correlator is being used in the receiving portion of an underwater object detecting system to process reflected or echo signals, the reference transparency would have recorded thereon the complex conjugate of the Fourier transform of the signal initially radiated into the fluid medium. A second spherical lens 13 is positioned such that reference transparency 18 lies in its front focal plane and a photomultiplier tube 14 or any other suitable energy detector, such as a second photographic sheet, is positioned in the back focal plane of this lens. This lens performs the inverse Fourier transform.

The apparatus just described, it will be recognized, constitutes a standard frequency plane optical correlator. In this type of correlator, the input signal is introduced in a space plane, and the reference signal is inserted in the frequency plane. The correlation peak appears off of the optical axis 15 in the output plane $P_3$ and moves opposite to the direction of film strip advance, tracking the moving input signal, appearing on axis only when the input signal and the reference function are aligned. Alternatively, as noted hereinbefore the input signal and the reference function both may be inserted in space planes. This is the so-called "space plane correlator" and, in this arrangement, the peak does not move in the manner described above but occurs on the optic axis in the output plane only at that time when the two functions are aligned. Thus, returning to the frequency plane correlator of FIG. 1, if the signal recorded on film strip 16 is undistorted, then the correlator peak first appears off of the optical axis 15 and is undetected by photomultiplier tube 14. As the film is advanced, this peak, as noted above, progresses to an on-axis point where it is registered by photomultiplier tube 14, thus indicating correlation between the compared signals. This correlation function has a half width which is inversely proportional to the bandwidth of the input signal being processed.

If the signal present in the space plane $P_1$ is distorted along its time base, that is, if the signal is a swept FM signal and portions thereof do not have the correct frequency because of a Doppler shift, for example, then the individual correlation amplitude samples derived from the various different portions of this signal will have dissimilar phases as they appear in the output plane $P_3$. Consequently, there will be destructive interference when they are added by energy detector 14. The output of the system, therefore, will be reduced to almost a zero level and, thus, the system will not provide an indication of the extent of the correlation which may exist between this distorted signal and the replica registered in the reference transparency.

According to the present invention, a scanning slit 20 whose width may be varied is moved in the space plane 1 by scanning drive means 19 rapidly past a segment of film strip 16, the length of which normally corresponds to the full aperture of the correlator. This movement may be back and forth over this length of the strip or slit 20 may be cut in a circular plate such that the rotation of this plate causes the slit to move past the film strip in one direction through a certain arc of its travel. The particular setting of this slit, that is, its width along the input signal track, is adjusted by any appropriate overlying shutter means, such as 21, until maximum signal is observed at the output of photomultiplier 14. The slit should scan the full signal length in determining proper slit width. In principle, it could be done at one position along the signal film, but since the signal time base usually is distorted in a somewhat irregular manner an appropriate slit width to match the average distortion along the signal time base should be chosen.

With the slit added to the correlator, only that portion of the input signal which is exposed by the slit is processed, with the reference functions stored in the transform plane $P_2$. Thus, a plurality of correlation functions are developed in the output plane $P_3$ as different segments of the input signal track are exposed to the reference function. The energies of these individual correlation functions are detected by energy detector 14 in the usual manner.

Because the slit reduces the length of input signal being processed to a much smaller segment than that normally treated in the full aperture system, the amount of distortion present within the slit is appreciably reduced. Thus, a peak correlation amplitude nearly equal to that for a fully coherent signal can be realized in plane $P_3$ using this smaller segment of the input signal. The individual correlation amplitudes developed in plane $P_3$ from the separate segments of the input signal still have the phase dissimilarities mentioned above, but since these are now developed sequentially in time the energy detector sums only their energies and not their complex amplitudes. Hence, destructive interference is avoided. However, for an FM signal the individual correlation functions do not possess the narrowness of the correlation function associated with the full aperture system. This means that if the input signal is fully coherent the correlator output with the slit is not as sharp or definitive as that which would be produced in the standard system. However, because the individual correlation functions are broader, they can be incoherently added with appreciable overlap by the energy detector, and this permits the present system to produce an effective output when the input signal is distorted along its time base.

The operation of the scanning slit may better be appreciated from the following description. As the slit moves to the right, as viewed in FIG. 1, along the direction of film advance, at its first point in time it will process a corresponding finite portion of the distorted input signal and, as shown in FIG. 2, a sample $1_1$ of the correlation function 30 appears in output plane $P_3$. As the scanning slit moves across the signal film, samples $2_1, 3_1, 4_1, \ldots 9_1$ are produced and added incoherently in the energy detector to produce the partially coherent correlation sample $N_1$. The slower motion of the signal film through the aperture of plane $P_1$ causes a second set of samples, $1_2, 2_2, 3_2, \ldots 9_2$, to be realized and added incoherently to give $N_2$ on the next scan of the slit across the signal film. Thus, the partially coherent correlation function samples $N_1, N_2, \ldots N_6$ are produced on successive scans of the slit as the signal film moves slowly through its aperture. Note that the peaks 31, 33, 35, 37 . . . of the correlation functions 30, 32, 34, 36 . . . for the individual segments of the signal film are not aligned in the X direction so that they all occur on the same scan of the slit. They occur, instead, at slightly offset, off-axis locations, indicating the presence of a degree of distortion in the time base of the input signal.

Because the scanning slit moves fast compared to film strip 16, it produces a sequence of correlation samples from the different segments of the input signal, all for a given average relative displacement, or misalignment, in the X-direction between the signal and reference functions. The individual segments of the signal have different actual displacements relative to the reference function because of signal time base distortion, as shown in the misalignment of the correlation peaks 31, 33, 35, 37 . . . in FIG. 2. As the signal film moves slowly, the displacement relative to the reference function is changed, and the full shape of the partially coherent correlation function 45 is developed slowly. The amplitudes of the correlation samples from individual segments of the signal are added incoherently in the energy detector because the latter squares the amplitude incident upon it at any one time. The motion of the scanning slit causes the amplitudes $1_1, 2_1, 3_1, \ldots 9_1$ to be incident at the energy detector at different times and therefore they are combined to give the incoherent sum $N_1$ only after squaring. It should be appreciated that the incoherent sum of these samples from the individual signal intervals illustrated results in a partially coherent correlation with the width of the main peak broader than the usual correlation function but similar to the individual functions from which it is derived.

It should be appreciated that the individual correlations depicted in FIG. 2, such as 30, 32, 34, etc., are simplified to the point where only the envelopes are shown. These envelopes modulate a carrier frequency whose phases are not identical from one interval to the next because of the time base distortions that are present. However, since the individual amplitude samples due to the operation of the scanning slit are squared before summing in the energy detector, the phase inconsistencies that would otherwise have reduced the coherent amplitude sum of wave form 45 to a very small value are removed. The squared amplitudes, that is, the intensities, are all positive and, therefore, they may be added without any cancellations due to any phase mismatch.

It would be pointed out that the actual width of the scanning slit is determined by trial and error if nothing is known ahead of time about the signal coherence of the input signal. This involves merely adjusting the slit so as to obtain maximum output from the photomultiplier. This adjustment can be made as the slit is scanned for a few cycles, the photomuliplier output observed, and then appropriate changes made to maximize this reading.

Once this setting is determined, only small changes need be made usually to accommodate subsequent gradual changes in coherence. These gradual changes, as indicated hereinbefore, which may be due to ocean conditions, receiver motions, etc., occur rather slowly and, thus, there is no difficulty in tracking the coherence of the input signal.

The method of the present invention is applicable to any arbitrary signal design, but it works particularly well with swept frequency FM signals, a chirp signal commonly utilized. The reason for this is that the Fourier transforms in plane $P_2$ of different segments of the signal in spatial plane $P_1$ are nonoverlapping and therefore do not produce interfering noise backgrounds for each other. Additionally, the bandwidth of a short segment of a swept FM signal is small. Therefore, the width of the main lobe of the correlation function is wide and, when several main lobes are added together in the incoherent energy addition in output plane $P_3$, they will overlap easily even though the signal distortions in plane $P_1$ may displace the centers of the main lobes in output plane $P_3$.

What is claimed is:

1. In an optical correlator for processing an intput signal distorted along its time base which is recorded as a density variation on a film strip moving in a first spatial domain of said correlator, the improvement of
    a scanning slit of adjustable width positioned adjacent said film strip and repeatedly scanning a portion of this film strip at a speed high as compared to the speed
    at which this film strip moves in said domain,
        each scanning cycle producing at the energy detector of said correlator one sample of the partially coherent correlation function and repeated scanning cycles developing the full, partially coherent, correlation function.

2. An optical correlator for processing partially coherent signals comprising, in combination,
    a first spherical lens;
    a recording strip having input signal information stored therein as density variations in the transparency of said strip positioned in the object plane of said lens;
    a light source located on the optical axis of said lens for illuminating an area on said strip with monochromatic coherent light;
    means for advancing said strip across the optical axis of said lens such that different areas of said strip are illuminated by said light source;
    a reference strip having the complex conjugate of the Fourier transform of a particular signal recorded thereon as density variations in the transparency of this strip positioned in the back focal plane of said lens;
    an energy detector;
    a second spherical lens located on said optical axis,
        said reference strip being in the front focal plane of said second lens, and
        said energy detector being in the back focal plane of said second lens;
    a scanning slit positioned adjacent said recording strip and having an opening as measured along said strip of variable size; and
    means for repeatedly moving said slit past a portion of said recording strip at a speed higher than the speed of advancement of said recording strip.

3. In an arrangement as defined in claim 2
    wherein said energy detector is a photomultiplier tube positioned on said optical axis and
    wherein the setting of said slit corresponds to the opening size thereof which develops a maximum signal in the output of said photomultiplier tube from the movement across said optical axis of a particular portion of said recording strip having input signals stored therein.

4. In an arrangement as defined in claim 2
    wherein the speed at which said slit moves past said recording strip is such that a multiplicity of scanning cycles occurs in the time a particular portion of said recording strip takes to move across said optical axis.

* * * * *